Sept. 2, 1969 P. E. OSBORN 3,465,301

DELAY LINE RESYNCHRONIZATION APPARATUS

Filed Feb. 15, 1967

INVENTOR.
PETER E. OSBORN
BY Charles R. Hepchinsky
ATTORNEY

United States Patent Office 3,465,301
Patented Sept. 2, 1969

3,465,301

DELAY LINE RESYNCHRONIZATION APPARATUS

Peter E. Osborn, San Leandro, Calif., assignor to Friden, Inc., a corporation of Delaware Filed Feb. 15, 1967, Ser. No. 616,222
Int. Cl. G11b *13/00*
U.S. Cl. 340—172.5 10 Claims

ABSTRACT OF THE DISCLOSURE

Apparatus for resynchronizing pulses on a delay line provides a series of timing pulses from a pulse source at intervals equal to the intervals at which the data bits, or pulses comprising a data train, were written onto the delay line and which is initiated by the first bit on the data train and terminated by the lapse of a predetermined period of time during which no pulses emerged from the delay line.

FIELD OF THE INVENTION

This invention relates to apparatus that synchronizes data on a delay line without the need of temperature control and/or pulse height discrimination.

PRIOR ART

Many of today's electronic computers employ one or more delay line memories. These memories, by recirculating data bits, provide data storage for the arithmetic and functional operations performed by the computer.

Such a delay line may typically be a column of mercury, having X-cut quartz crystals mounted on each end, or a length of magnetostrictive material. A data bit is placed on the mercury delay line by applying an input pulse in the form of an electrical vibration to the input crystal. The crystal sets up an acoustic wave in the mercury column which travels to the output end. The crystal on the output end converts the ultrasonic wave back into an electrical pulse. The time required for the acoustic wave to travel from one end of the mercury column to the other end is the delay time of the delay line. It is possible that, given this delay, at any given time, a multitude of pulses may be traveling from one end of the delay line to the other. These pulses may be retained indefinitely by routing them from the output portion of the delay line back into the input.

Pulses which are continuously being recirculated on a mercury or acoustic delay line may deteriorate in waveform during each cycle. This deterioration has a cumulative effect and in order to prevent it, an electronic gate is usually provided to gate a pulse from a continuously running pulse generator to the input of the delay line each time a pulse emerges from the delay line. The effect of this gating is the same as if the pulse emerging from the delay line were to be directly recirculated, but renewed in waveform.

To achieve the pulse reshaping, it is required that the pulse generator and the delay line delay time be synchronized, that is, that the pulse generator produce a pulse at the same time that a pulse is expected to emerge from the delay line. Consequently, the environment of the delay line must be closely controlled. This may be accomplished by enclosing the delay line in a temperature-controlled oven.

Another method of maintaining synchronism between the bits emerging from the delay line and the pulse generator, and which also obviates the use of the temperature-controlled oven, is to provide a packet, or series, of pulses from a reference pulse source. The starting time of each packet of pulses is determined by a large synchronizing pulse at the beginning of the data train of pulses on the delay line. When the synchronizing pulse emerges from the delay line, it will cause a one-shot multivibrator to trigger on for a predetermined period of time and initiate the packet of pulses. This method, however, cannot be employed with a delay line which does not recognize variations in pulse amplitudes, such as a magnetostrictive delay line.

Accordingly, it is an object of this invention to provide a delay line which may be operated free from strict temperature limitations for pulse synchronization.

It is also an object of this invention to provide a sequence of pulses for synchronizing the pulses of the data train on the delay line, which is not dependent on delay line pulse amplitude discrimination.

Still another object of this invention is to provide apparatus to synchronize data onto mercury or magnetostrictive delay lines.

SUMMARY OF THE INVENTION

In accordance with one aspect of the invention, a delay line is adapted to recirculate a data train of pulses through an electronic gate controlled by a pulse source. A one-shot multivibrator within the pulse source senses pulses which emerge from the delay line and will set when a period of time passes during which no pulses emerge. The first pulse to emerge from a delay line after the multivibrator has set will be recognized as the first pulse, or the synchronization pulse, in the data train and will initiate the pulse source.

This invention, as well as other features, objects and advantages thereof will be readily apparent from consideration of the following detailed description relating to the accompanying drawings, wherein.

DETAILED DESCRIPTION

Figures 1, 2:
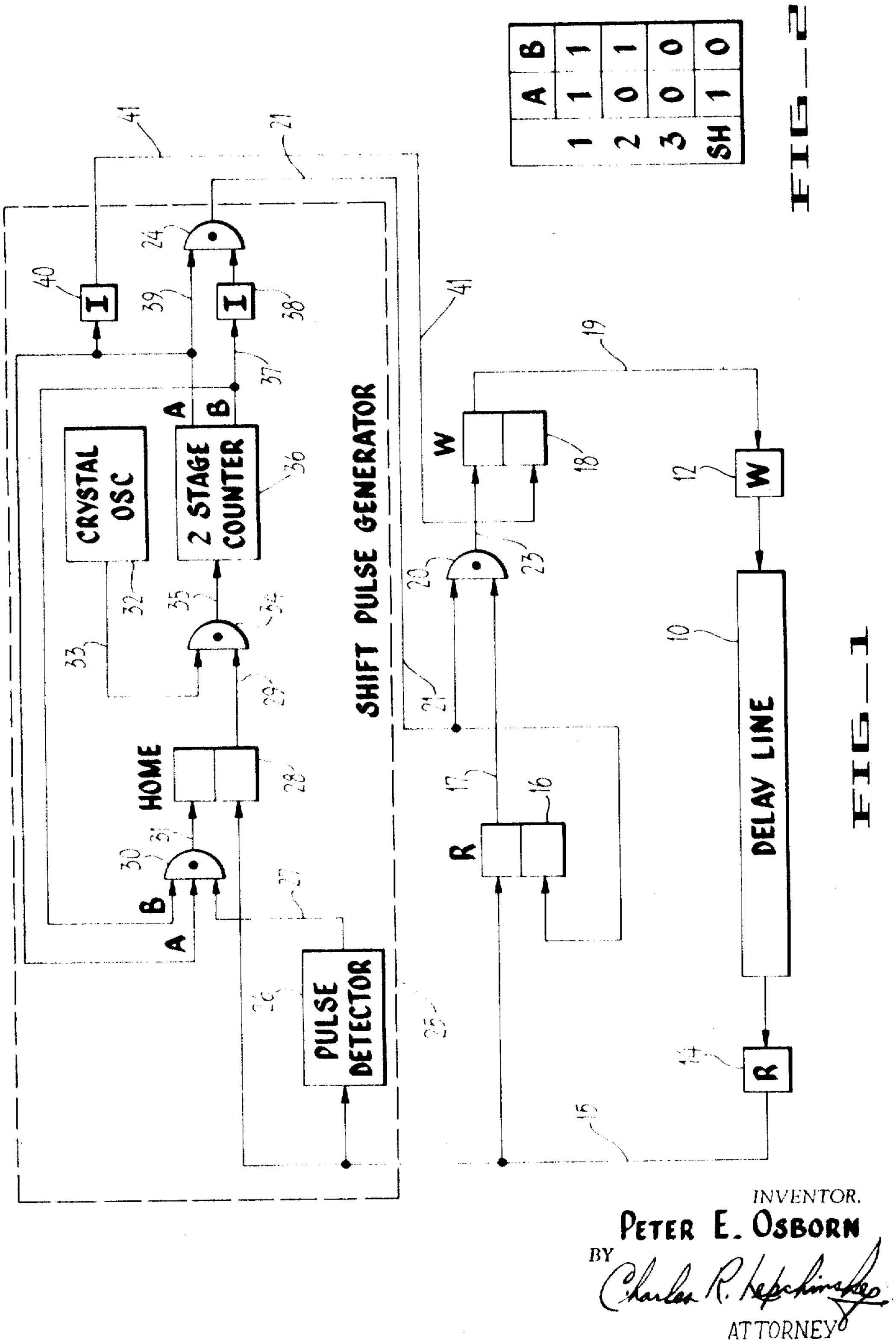
FIG. 1 is a block diagram of a circuit embodying the present invention.
FIG. 2 is a chart representing the sequential conditions of a two-stage counter in FIG. 1.

The present invention is embodied in the diagram of FIG. 1. A delay line 10, such as a magnetostrictive delay line, provides a predetermined delay in a preferred embodiment of the present invention and is adapted to recirculate a data train of data pulses.

Write flip-flop 18 is the input to delay line 10, and when it is set true, a signal appearing on line 19 will cause write circuitry 12 to launch a mechanical vibration, or data pulse, on the delay line 10. Since write circuitry 12 will launch a data pulse only when the signal on line 19 transitions from false to true, write flip-flop 18 must be reset false after each data pulse is launched. A signal on line 41 from shift pulse generator 25 will reset flip-flop 18 false.

A data pulse launched on the delay line 10 will travel from the write circuitry 12 to the read circuitry 14 where it is converted from a mechanical vibration to an electrical signal on line 15. Read flip-flop 16 is set true by a signal on line 15 indicating a data pulse has just emerged from the delay line 10. The read flip-flop 16 will remain true until a signal on line 21 from shift pulse generator 25 resets it false. With read flip-flop 16 set true, AND gate 20 is enabled by a true signal on line 17. AND gate 20 will generate a true output on line 23, setting write flip-flop 18 true when the signal on line 21 is true.

The recirculation path of a data pulse, therefore, includes write flip-flop 18, write circuitry 12, delay line 10, read circuitry 14, read flop-flop 16 and AND gate 20.

Each data pulse emerging from the delay line 10 is set into the read flip-flop 16. The read flip-flop 16 will remain set true to indicate that a data pulse has emerged from the delay line 10 until a signal on line 21 is received causing it to reset false. The read flip-flop 16, therefore, provides a data pulse retention means.

AND gate 20 is an electronic gating means which couples the signal on line 21 to the input of the delay line 10, through the write flip-flop 18, whenever it is enabled by the read flip-flop 16.

The shift pulse generator 25 provides a series of shift pulse on line 21 to the electronic gating means, AND gate 20, for causing a data pulse to be launched on the delay line 10, if AND gate 20 is enabled by read flip-flop 16. The shift pulses on line 21 will also cause the read flip-flop 16 to reset false and disable the AND gate 20. While read flip-flop 16 is false, a data pulse may not be launched on the delay line 10. Accordingly, a data pulse will be launched on the delay line 10 whenever the shift pulse generator generates shift pulses on line 21, only if the read flip-flop 16 is true, indicating that a data pulse has emerged from the delay line since the last shift pulse was generated on line 21 which reset the read flip-flop 16 false.

The shift pulse generator 25 includes a pulse detector 26, a home flip-flop 28, crystal oscillator 32, two-stage counter 36, inverters 38 and 40, and AND gates 24, 30 and 34 which are interconnected as shown.

Crystal oscillator 32 has a cyclic output on line 33 to AND gate 34. When the AND gate 34 is enabled by a true signal on line 29, the output of AND gate 34 on line 35 follows the signal on line 33.

Two-stage counter 36 contains two bistable elements (not shown) having outputs A and B, respectively. These bistable elements are interconnected to count in the sequence shown in the chart of FIG. 2. The two bistable elements in counter 36 will advance from one of the four counts shown in FIG. 2 to the next count for each cycle of the oscillator 32 sensed by the counter 36 on line 35. As can be seen in FIG. 2, the counter 36 recycles every four counts. If AND gate 34 is not enabled by a true signal on line 29, the counter 36 will not sense the output of oscillator 32 and will cease counting. AND gate 34, is, therefore, an electronic gating means for coupling the output of the oscillator 32 to the input of counter 36.

The output of the first bistable element A in counter 36 on line 39 is an input to AND gate 24. The output of the second bistable element B in counter 36 on line 37, after it is inverted by inverter 38, is also an input to AND gate 24. And gate 24 will have a true output on line 21 when the signal on line 39 is true (A true) and when the output of inverter 38 is true (B false). Therefore, the signal on line 21 from the shift pulse generator 25 is true when the bistable elements of counter 36 are in the condition shown in the "SH" count in FIG. 2.

The signal on line 39 is an input to inverter 40. The output of inverter 40 on line 41 will be true when the signal A from the counter 36 is false. It can be seen from the chart in FIG. 2 that the A signal will be false during counts "2" and "3."

Recalling that a data pulse will be launched on the delay line 10 every time a shift pulse is generated by shift pulse generator 25 on line 21 if read flip-flop 16 is true, it can be seen that for every four cycles of the oscillator 32, the counter 36 will assume the "SH" configuration and a shift pulse will be generated on line 21. Two counts of counter 36 after the shift pulse has been generated, causing the write flip-flop 18 to set true, the A signal on line 39 is false causing inverter 40 to generate a true signal which resets the write flip-flop 18 false in anticipation of the next signal on line 23.

So long as the counter 36 continues to count in response to the cyclic output of the oscillator 32, data pulses will continue to be launched on the delay line 10 whenever the read flip-flop 16 is true. If the electronic gating means, AND gate 34, is disabled by the signal on line 29 going false, no more data pulses will be launched.

Pulse detector 26, AND gate 30 and the home flip-flop 28 comprise the enabling means which enables the electronic gating means, AND gate 34, by way of line 29. Home flip-flop 28 will generate a true output on line 29 enabling AND gate 34 when it is in a false state. Home flip-flop 28 will be reset false by a data pulse emerging from the delay line 10 indicated by the signal on line 15 and will be set true by a true output from AND gate 30 on line 31. AND gate 30 will have a true output only when the pulse detector 26 has a true output on line 27 and the bistable elements of counter 36 indicate that the counter 36 is in a "1" configuration.

The pulse detector 26 is a one-shot multivibrator which is continually attempting to "time out." However, as each pulse emerges from the delay line 10, indicated by a signal on line 15, the detector 26 is reinitiated, that is, if a predetermined period of time elapses during which no signal appears on line 15, i.e., no data pulse emerges from the delay line 10, the detector 26 will "time out" and generate a true signal on line 27 enabling AND gate 30.

Assuming now that a period of time elapses during which no data pulses emerge from the delay line 10, the detector 26 would generate a true signal on line 27 enabling AND gate 30. The output of gate 30 on line 31 will remain false although gate 30 is enabled until the counter 36 assumes a "1" count, at which time the home flip-flop will be set true. When home flip-flop 28 is set true, the signal on line 29 will go false, disabling AND gate 34, which results in the counter 36 terminating its counting sequence. The shift pulse generator 25 will remain in this idle condition until a data pulse emerges from the delay line 10. A signal on line 15 will cause the output of detector 26 to assume a false condition and cause it to reinitiate its "time out" period and will reset false the home flip-flop 28, resulting in a true output on line 29, enabling AND gate 34. Counter 36 sitting idle in a "1" count thereupon initiates its counting sequence, generating its first shift pulse three counts subsequent.

It is readily apparent, therefore, that the correct operation of the present invention requires that the maximum number of pulses on the delay line 10 have a duration of less than the delay time provided by delay line 10 and that the difference between the delay time of the delay line 10 and the duration of the data train of pulses be at least equal to the "time out" period of the pulse detector 26 plus four cycles of the oscillator 32. These requirements guarantee a period of time during which no data pulses will emerge from the delay line 10 which will allow the detector 26 to set, stopping the counter 36 at a predetermined configuration, a count of "1," so that when the first data pulse of the data train emerges from the delay line 10, the first shift pulse on line 21 is generated after a specific lapse of time, thus synchronizing shift pulses with data pulses. By utilizing this technique, the present invention operates independent of variations in the delay time of the delay line 10.

Since the shift pulses are generated at equal specific intervals and the first shift pulse is generated in synchronism with the first data pulse on the data train, the entire series of shift pulses generated by the shift pulse generator 25 should be substantially in synchronism with the data train of data pulses.

The read flip-flop 16, as previously discussed, provides a data pulse retention means and allows the indication of the presence of the data pulse output from the delay line 10 to be retained until a shift pulse from the shift pulse generator 25 causes a data pulse to be launched. The same shift pulse on line 21 which causes the data pulse to be launched also removes the indication of a data pulse output. The read flip-flop 16, therefore, will record and maintain the fact that a data pulse has emerged from delay line 10 since the last shift pulse was generated. This allows the interval between data pulses to vary. The data pulses, when launched on the delay line 10, have the same interval as the interval between shift pulses or a multiple thereof, and, under ideal circumstances will maintain that interval. However, ambient temperature changes will vary the interval between data pulses. The use of the read flip-flop 16 allows the interval between data pulses to vary up to a maximum of four cycles of the oscillator 32 or the interval between shift pulses.

In a preferred embodiment of the present invention a magnetostrictive delay line with a 10 millisecond delay was employed and the oscillator 32 had a frequency of 2.5 megacycles. The 1600 nanoseconds ($10^{-9}$ seconds) allowable variation for this frequency in data pulse interval would require such an extreme variation in ambient temperature between pulses being launched as to make the possibility as a practical matter nonexistent.

The present invention, therefore, eliminates the necessity of closely controlling the environment of the delay line 10 with an expensive temperature controlled oven. The present invention, by causing the shift pulse generator 25 to initiate the series of shift pulses when the first data pulse emerges from the delay line 10 after a period of time has lapsed when no pulses emerged from the delay line 10, has eliminated the necessity that the delay line 10 be a medium capable of sustaining data pulses of varying amplitudes or durations and has also eliminated the requirement that the associated write circuitry 12 be capable of propagating such variations and the read circuitry 14 be capable of converting such variations to electrical signals accurately. These savings are also accompanied by the elimination of circuitry external to the delay line 10 and its read and write circuitry 12 and 14, respectively, for discriminating between data pulses emerging from the delay line 10 on the basis of amplitude or duration. Also, this invention eliminates the necessity that the delay line length be an exact multiple of the oscillator 32 period as is required by many prior art devices. This is so because one or more periods of no pulses causes subsequent pulses to restart the oscillator 32 at the same time that the counter 36 is in its initial condition.

Changes may be made in the combination and the arrangement of parts or elements as heretofore set forth in the specification and shown in the drawings, it being understood that changes may be made in the embodiments disclosed without departing from the spirit and scope of the invention as defined in the following claims.

What is claimed is:

1. A delay line resynchronization apparatus comprising:

(1) a delay line adapted to recirculate a data train of pulses;

(2) shift pulse generating means for generating a series of shift pulses which is initiated by the first pulse of the data train emerging from the delay line and is terminated after a predetermined period of time elaspes during which no pulses emerge from the delay line; and (3) an electronic gating means for coupling the output of the shift pulse generating means to the input of the delay line when a pulse has emerged from the delay line subsequent to the last shift pulse generated.

2. A delay line resynchronization apparatus comprising:

(1) a delay line adapted to recirculate a date train of data pulses;

(2) a shift pulse generating means for generating a series of shift pulses for a period initiated by the first data pulse of the data train and terminated when a predetermined period of time elapses during which no data pulses emerge from the delay line;

(3) a data pulse retention means responsive to data pulses emerging from the delay line for indicating the presence of a data pulse at the output of the delay line and also responsive to a shift pulse generated by the shift pulse generating means for removing the indication of the presence of a data pulse; and (4) an electronic gating means for coupling the output of the shift pulse generating means to the input of the delay line when the data pulse retention means indicates the presence of a data pulse output from the delay line since the last shift pulse was generated by the shift pulse generating means.

3. The apparatus of claim 2 wherein said delay line is a magnetostrictive delay line.

4. The apparatus of claim 2 wherein said delay line is a mercury column delay line.

5. The apparatus of claim 2 wherein said shift pulse generating means includes:

(1) a crystal controlled oscillator having a cyclic output;

(2) a two stage counter;

(3) a second electronic gating means for coupling the output of said crystal controlled oscillator to the input of said two stage counter whenever the electronic gating means is enabled; and (4) an enabling means for enabling the second electronic gating means for a period of time which is initiated by the first data pulse of the data train and which is terminated a predetermined period of time after the last data pulse on the data train has emerged from the delay line.

6. The apparatus of claim 2 wherein said data pulse retention means includes a flip-flop which is set true by a data pulse emerging from the delay line and set false by a shift pulse generated by the shift pulse generating means.

7. The apparatus of claim 2 wherein said electronic gating means includes an AND gate having the output of the shift pulse generating means as an input and at least one enabling input including the output of the data pulse retention means whereby the output of said shift pulse generating means will be coupled to the input of the delay line whenever said data pulse retention means indicates a data pulse has emerged from the delay line subsequent to the last shift pulse generated by said shift pulse generating means.

8. The apparatus of claim 5 wherein said enabling means includes a one-shot multivibrator responsive to data pulses emerging from the delay line and generating a true output when a predetermined period of time elapses during which no data pulses emerge from the delay line.

9. The apparatus of claim 8 further including an AND gate having a predetermined configuration of said two stage counter as an input and at least one enabling input including the output of the one-shot multivibrator whereby a true output is generated from the AND gate whenever the output of the one-shot multivibrator is true and the two stage counter has assumed the predetermined configuration.

10. The apparatus of claim 9 further including a home flip-flop which will set true in response to a true output from said AND gate and will set false whenever a data pulse emerges from the delay line, said false output from the home flip-flop constitutes the enabling signal to the electronic gating means.

References Cited

UNITED STATES PATENTS

| | | | |
|---|---|---|---|
| 2,961,535 | 11/1960 | Lanning. | |
| 3,273,131 | 9/1966 | Strohm et al. | 340—172.5 |
| 3,350,697 | 10/1967 | Hirvela | 340—172.5 |

RAULFE B. ZACHE, Primary Examiner